(12) United States Patent
Huang

(10) Patent No.: US 9,324,137 B2
(45) Date of Patent: Apr. 26, 2016

(54) LOW-FREQUENCY COMPRESSION OF HIGH DYNAMIC RANGE IMAGES

(71) Applicant: Marvell World Trade Ltd., St. Micheal (BB)

(72) Inventor: Samson Huang, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 75 days.

(21) Appl. No.: 14/059,265

(22) Filed: Oct. 21, 2013

(65) Prior Publication Data

US 2014/0112595 A1 Apr. 24, 2014

Related U.S. Application Data

(60) Provisional application No. 61/717,904, filed on Oct. 24, 2012.

(51) Int. Cl.
| | | |
|---|---|---|
| *G06K 9/40* | (2006.01) | |
| *G06T 5/00* | (2006.01) | |
| *H04N 5/235* | (2006.01) | |
| *H04N 19/63* | (2014.01) | |
| *H04N 19/98* | (2014.01) | |

(52) U.S. Cl.
CPC ............ *G06T 5/007* (2013.01); *G06T 5/008* (2013.01); *H04N 5/2355* (2013.01); *H04N 19/63* (2014.11); *H04N 19/98* (2014.11); *G06T 2207/20208* (2013.01)

(58) Field of Classification Search
None
See application file for complete search history.

(56) References Cited

U.S. PATENT DOCUMENTS

| | | | | |
|---|---|---|---|---|
| 5,012,333 A * | 4/1991 | Lee | ...................... | H04N 1/4072 358/520 |
| 5,357,549 A | 10/1994 | Maack et al. | | |
| 5,394,195 A * | 2/1995 | Herman | ................... | H04N 9/69 348/675 |
| 6,078,686 A * | 6/2000 | Kim | ........................ | H04N 1/58 348/E9.042 |
| 6,633,657 B1 * | 10/2003 | Kump | ..................... | G06T 5/009 358/519 |
| 6,826,310 B2 * | 11/2004 | Trifonov | ................... | G06T 5/40 382/168 |
| 2008/0187194 A1 * | 8/2008 | Zhang | ..................... | G06T 5/008 382/128 |
| 2009/0097561 A1 * | 4/2009 | Chiu | ...................... | H04N 19/30 375/240.16 |
| 2009/0161953 A1 | 6/2009 | Ciurea et al. | | |
| 2010/0260432 A1 * | 10/2010 | Shimizu | ................. | G06T 5/002 382/255 |
| 2010/0303377 A1 | 12/2010 | Maeda et al. | | |
| 2011/0285737 A1 * | 11/2011 | Lin | ......................... | G09G 5/10 345/589 |
| 2012/0189206 A1 * | 7/2012 | Iketani | .................... | G06T 5/004 382/190 |

FOREIGN PATENT DOCUMENTS

| | | |
|---|---|---|
| WO | WO02089060 | 11/2002 |
| WO | WO2011108620 | 9/2011 |

* cited by examiner

*Primary Examiner* — Jayesh A Patel

(57) ABSTRACT

Methods and apparatuses for adjusting a global dynamic range of an image are described. An image is decomposed into (i) a low spatial frequency component and (ii) a high spatial frequency component. The global dynamic range of the low spatial frequency component is adjusted to produce an adjusted low spatial frequency component. The image is reconstructed with (i) the adjusted low spatial frequency component and (ii) the high spatial frequency component to thereby produce a processed image.

18 Claims, 7 Drawing Sheets

LOW-FREQUENCY COMPRESSION OF HIGH DYNAMIC RANGE IMAGES

CROSS REFERENCE TO RELATED APPLICATIONS

This claims priority to U.S. Provisional Patent Application No. 61/717,904, filed Oct. 24, 2012, which is incorporated herein by reference.

TECHNICAL FIELD

Embodiments of the present disclosure relate to the field of image signal processing, and in particular to processing of high dynamic range images using low-frequency tone curve mapping.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The human retina has a static dynamic range of approximately 100:1. This means that the darkest area in a field of view that can be distinguished by the retina is 1/100th as bright as the brightest area in the field of view that can be distinguished. But as the eye moves around in a scene to focus on new objects, the retina adjusts its exposure both chemically and geometrically (by adjusting the iris size of the pupil) in order to adjust to brighter and darker objects in an environment. This exposure adjustment occurs so quickly that a person does not notice it happening. The result is that the human eye has an effective dynamic range of 1,000,000:1, allowing a person to perceive both dark and bright objects in a high dynamic range (HDR) environment.

A typical 8-bit digital camera, on the other hand, can produce images having a dynamic range of 255:1, and a typical liquid crystal (LCD) display or cathode ray tube (CRT) display has a dynamic range of approximately 200:1. Thus, digital photographs and typical display devices have dynamic ranges that are far less than the effective dynamic range of the human eye. And when a person views an HDR image, they are often frustrated to see that the photograph shows neither the bright objects nor the dark objects very well, even though they can easily perceive both types of objects when using their own eyes to view the same scene. A typical example is a photograph of a person standing indoors next to a window. Even though the person standing next to the window can be easily seen with the naked eye, a photograph of the scene makes the person too dark to perceive.

To resolve this issue, tone curves are often applied to HDR images. Tone curves adjust the brightness of the pixels in the image to make the dark objects brighter and the bright objects darker. Another solution is to increase the backlighting of the image being displayed in order to more easily see features in dark regions.

SUMMARY

In various embodiments, the present disclosure describes methods for adjusting a global dynamic range of an image. An image is decomposed into (i) a low spatial frequency component and (ii) a high spatial frequency component. The global dynamic range of the low spatial frequency component is adjusted to produce an adjusted low spatial frequency component. The image is reconstructed with (i) the adjusted low spatial frequency component and (ii) the high spatial frequency component to thereby produce a processed image.

In embodiments, the decomposing the image includes low-pass filtering the image to produce the low spatial frequency component, and dividing the image by the low spatial frequency component to thereby produce the high frequency component.

In embodiments, the method further comprises selecting a window size of a low-pass filter to perform the low-pass filtering based on one or more sizes of (i) a plurality of bright regions of the image and (ii) a plurality of dark regions of the image.

In embodiments, reconstructing the image includes multiplying the adjusted low spatial frequency component and the high spatial frequency component.

In embodiments, adjusting the dynamic range of the low spatial frequency components includes applying a tone curve to the low spatial frequency component to produce the adjusted low spatial frequency component.

In embodiments, the image has a first global dynamic range that exceeds a dynamic range of the display device, and the processed image has a second global dynamic range that fits within the dynamic range of the display device.

In various embodiments, the present disclosure describes an apparatus comprising a display device and an image processing component. The image processing component is configured to decompose a high dynamic range (HDR) image into (i) a low spatial frequency component and (ii) a high spatial frequency component. The image processing component is also configured to adjust the dynamic range of the low spatial frequency component to produce an adjusted low spatial frequency component, and reconstruct the HDR image with (i) the adjusted low spatial frequency component and (ii) the high spatial frequency component to produce a processed image for display on the display device.

In embodiments, the image processing component is further configured to decompose the image by low-pass filtering the image to produce the low spatial frequency component, and dividing the image by the low spatial frequency component to produce the high frequency to thereby produce the high frequency component.

In embodiments, the image processing component is further configured to select a window size of a low-pass filter to perform the low-pass filtering based on one or more sizes of (i) a plurality of bright regions of the image and (ii) a plurality of dark regions of the image.

In embodiments, the HDR image has a first global dynamic range that exceeds a dynamic range of the display device, and the processed image has a second global dynamic range that fits within the dynamic range of the display device.

In embodiments, the image processing component is further configured to adjust the dynamic range of the low spatial frequency components by applying a tone curve to the low spatial frequency component to thereby produce an adjusted low spatial frequency component. In embodiments, the tone curve is an inverse-S tone curve.

In embodiments, reconstructing the image includes multiplying the adjusted low spatial frequency component and the high spatial frequency component.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Overview

High dynamic range (HDR) images are processed so that their global dynamic ranges are compressed while preserving local contrast. The resulting images show both dark and bright regions with good contrast, while reducing the differences between the brightest and the darkest regions. This allows the dynamic range of the image to fit within the dynamic range of a typical display device, or within the dynamic range of a digital photograph, video frame, or other digital image. The processed images are more accurate-looking than applying a global tone curve, as in conventional HDR image processing. By compressing the global dynamic range but preserving local contrast, a processed image mimics the human experience of viewing the scene with eyes that rapidly adjust when glancing between bright and dark areas within the scene.

These and other aspects are described in more detail below.

Illustrative Embodiment

Figure 1:
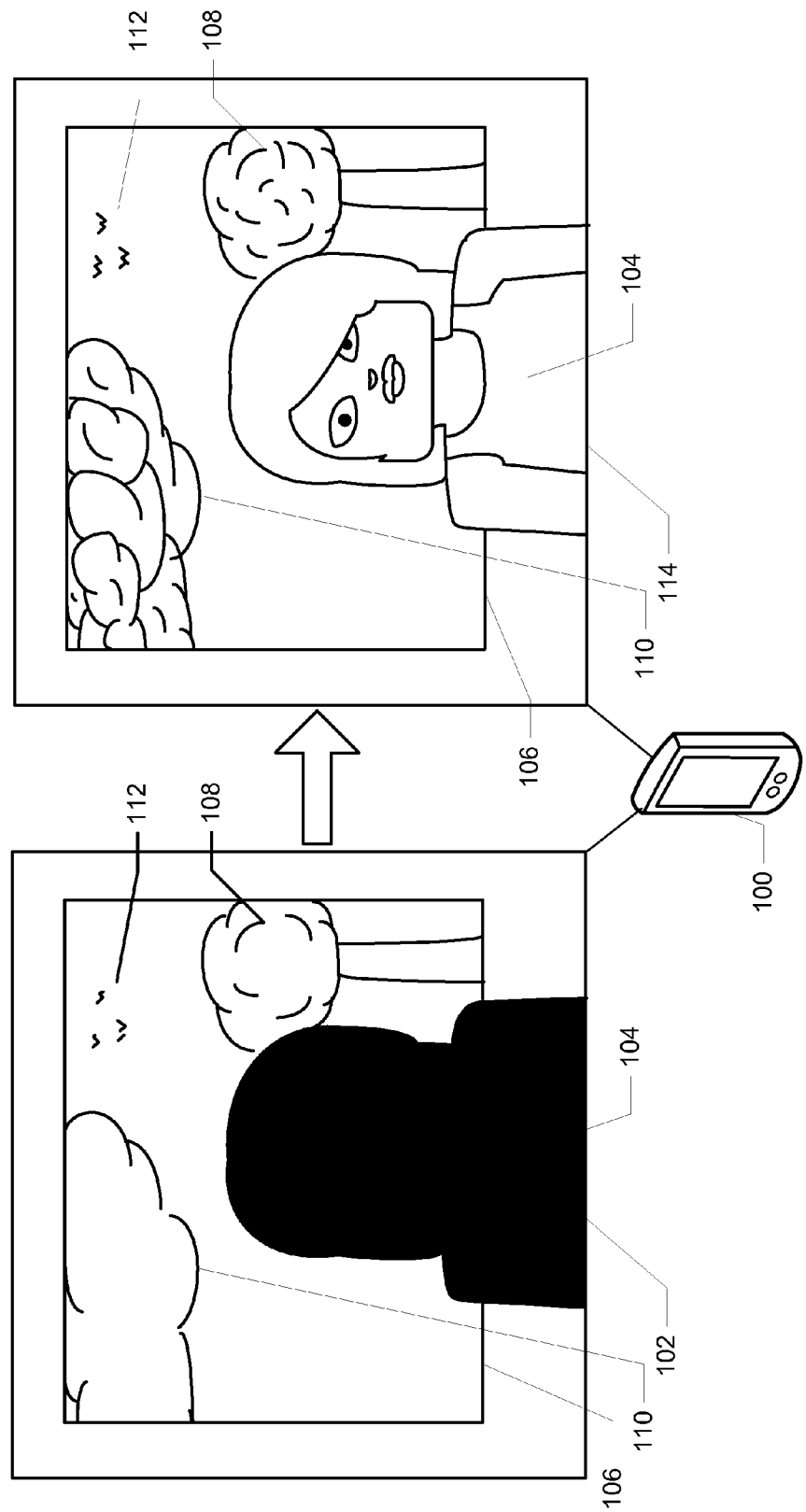
FIG. 1 illustrates the processing of a high dynamic range (HDR) image.

FIG. 1 illustrates the processing of a high dynamic range (HDR) image by device 100. The device 100 captures or receives images, such as HDR image 102. The HDR image 102 may be a digital photograph, a digital video frame, or other image that is captured or received by a device 100. The device 100 is illustrated in FIG. 1 as a hand-held device, but devices in accordance with various embodiments include, without limitation, desktop computers, servers, video editing systems, notebook computers, digital cameras, personal data assistants (PDA), mobile phones, media players, video game devices (including hand-held video game devices), tablet computers, televisions, computer monitors, and so forth.

An image, such as the HDR image 102, includes multiple components in the two-dimensional spatial frequency domain, ranging from a relatively low spatial frequency to a relatively high spatial frequency. The low spatial frequency components reflect the image's coarse variation, and the high spatial frequency components reflect the image's fine variation. An HDR image's coarse variations are very large, with many values near maximum and minimum brightness. To reduce the global dynamic range of the HDR image 102, embodiments reduce the coarse variations while leaving the fine variations the same, or mostly the same. Embodiments accomplish this by decomposing the HDR image 102 into low spatial frequency components and high spatial frequency components, compressing the low spatial frequency components, and then adding the high spatial frequency components back to the compressed low spatial frequency components to obtain a processed image, such as the reconstructed image 114.

The reconstructed image 114 more clearly shows features of a person 104, the tree 108, the clouds 110, and the birds 112. The person 104 is made brighter, relative to the scene in the window 106, but local contrast features of the person 104, such as the eyes, nose, mouth, and hair, are preserved, thereby making the image of the person 104 more realistic than if a tone curve were applied to the entirety of the HDR image 102 to produce a processed image. Also, the local contrast features of the bright objects—the tree 108, the clouds 110, and birds 112—are preserved, making them appear more realistic while also making them darker relative to the person 104. The overall effect is to produce a realistic-looking image compared to applying a global tone curve to the entire HDR image 102.

Figure 2:
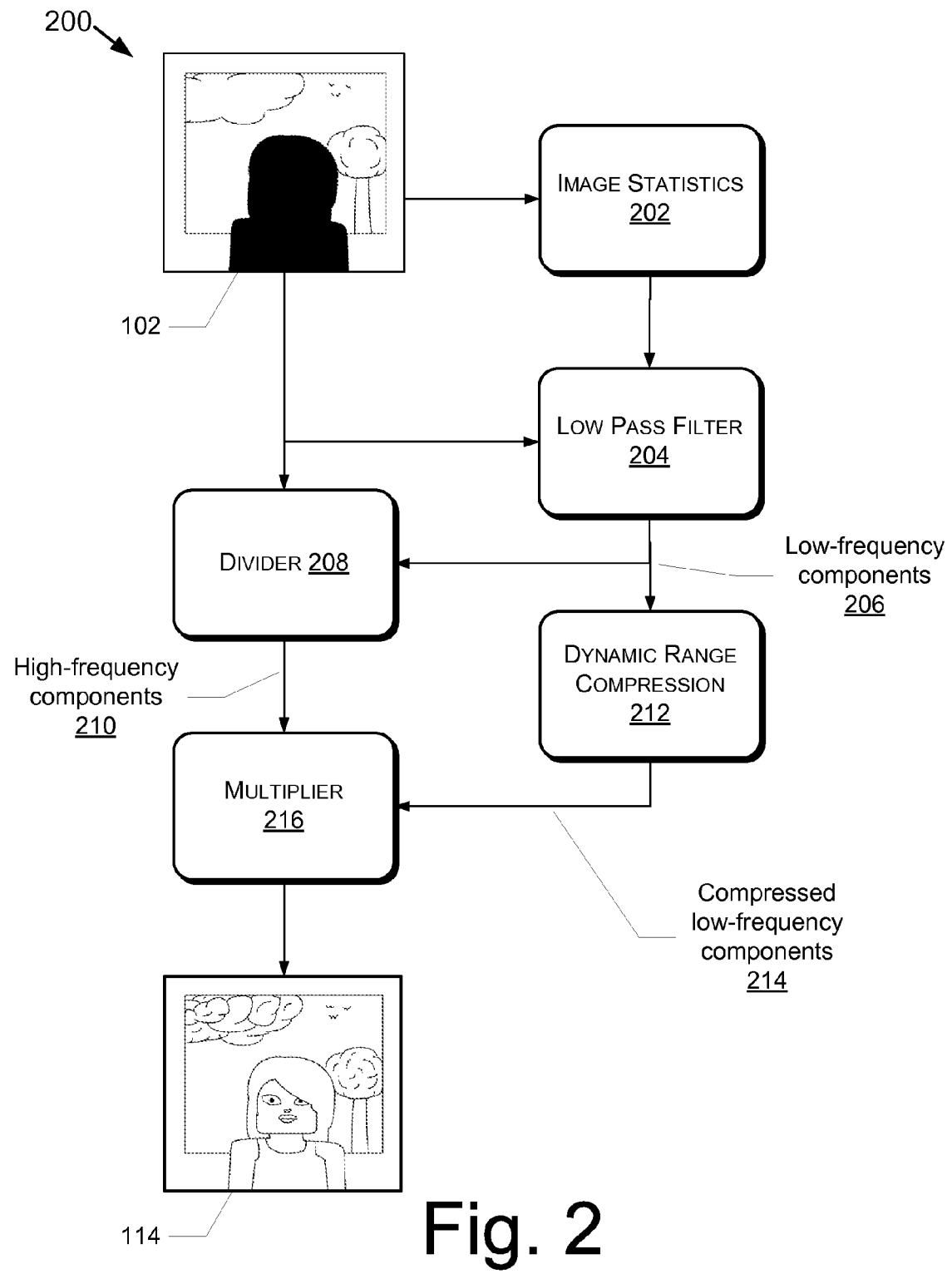
FIG. 2 illustrates an exemplary flow of a process for compressing the global dynamic range of an image while preserving local contrast.

FIG. 2 illustrates an exemplary flow of a process 200 for compressing the global dynamic range of an image while preserving local contrast. Referring to FIG. 2, the device 100 determines image statistics 202, which are used to select a low-pass filter 204. The low-pass filter 204 allows the coarse (low-frequency) components of the HDR image 102 in the spatial domain to pass, while filtering out the fine (high-frequency) components of the HDR image 102 in the spatial domain. The image statistics 202 include sizes of a plurality of dark regions and bright regions of the HDR image 102. The window size of the low-pass filter 204 may be based on the sizes of these dark and bright regions. In some embodiments, the window size of the low-pass filter 204 is selected based on the smallest of the dark and bright regions of the HDR image 102, such that the window size is equal to or greater than the size of the smallest of the dark and bright regions. In one specific example, if the smallest of the dark and bright regions is 100 pixels by 100 pixels, a Gaussian low-pass-filter with a window size of 127 bits by 127 bits is selected to filter the HDR image 102. In other embodiments, other window sizes are selected, such as based on an average size of the bright and dark regions, based on percentile (for example, selected to be larger than at least 95% of the bright and dark regions (or other percentage)), based on the second-smallest dark or bright region, the third-smallest dark or bright region, and so forth.

Passing the HDR image 102 through the low-pass filter 204 produces low spatial frequency components 206 of the HDR image 102. A divider 208 divides the low spatial frequency components 206 from the HDR image 102 to produce the high spatial frequency components 210. The division is accomplished pixel-by-pixel. When dividing by a small number, the result may be clamped, such as at 255 in an 8-bit image. Dynamic range compression 212 compresses the dynamic range of the low spatial frequency components of the HDR image 102 to produce compressed low-frequency components 214. Compressing the dynamic range includes applying a tone curve to the low-frequency components 206. In one example, an inverse-S tone curve is applied as is described in more detail below.

A multiplier 216 multiplies the high-frequency components 210 to the compressed low-frequency components 214 to produced reconstructed image 114, as shown in FIG. 1. In alternative embodiments not illustrated in FIG. 1, the divider 208 is replaced with a subtractor configured to subtract the HDR image 102 by the low-frequency components 206 to produce the high-frequency components, and the multiplier 216 is replaced with an adder to add the high-frequency components 210 to the compressed low-frequency components 214 to produce the reconstructed image 114.

Figure 3A:
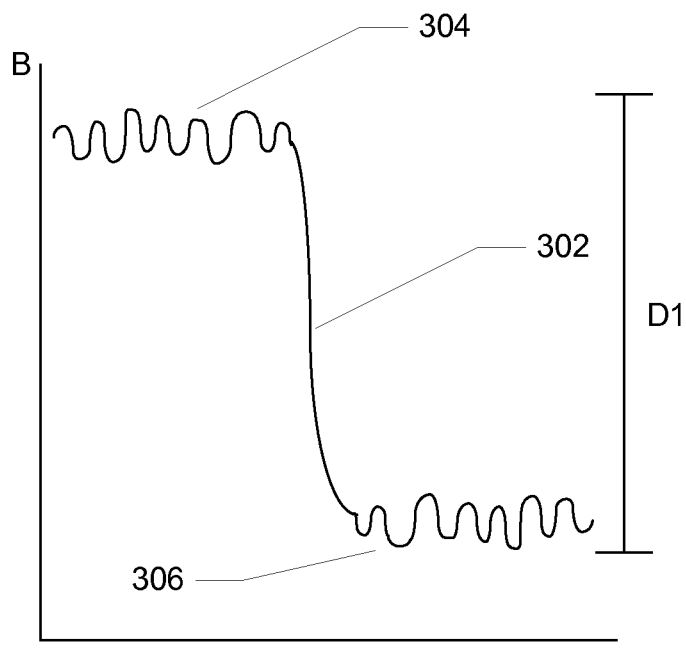
FIG. 3A illustrates a graph of spatial frequency components of an HDR image.

FIG. 3A illustrates a graph of the spatial frequency components 302 of an HDR image, such as the HDR image 102. The brightness of a pixel on the "x" axis is plotted relative to its brightness "B" axis of the graph shown in FIG. 3A. Thus, the graph includes a bright region 304 and a dark region 306 of the HDR image 102. When the HDR image 102 is captured by a typical 8-bit camera (for example), or when displayed on a typical display, the local contrast elements in the bright region 304 and the dark region 306 will be attenuated in order to make the global brightness delta D1 fit into the dynamic range of the image capture device or the dynamic range of the display. This makes it difficult to discern the local contrast features of the bright region 304 and the dark region 306 when viewing the unprocessed image. D1 represents the global dynamic range of the HDR image 102, which is greater than the dynamic range of the display that displays the HDR image 102 or the image capture device that captures the image.

Figure 3B:
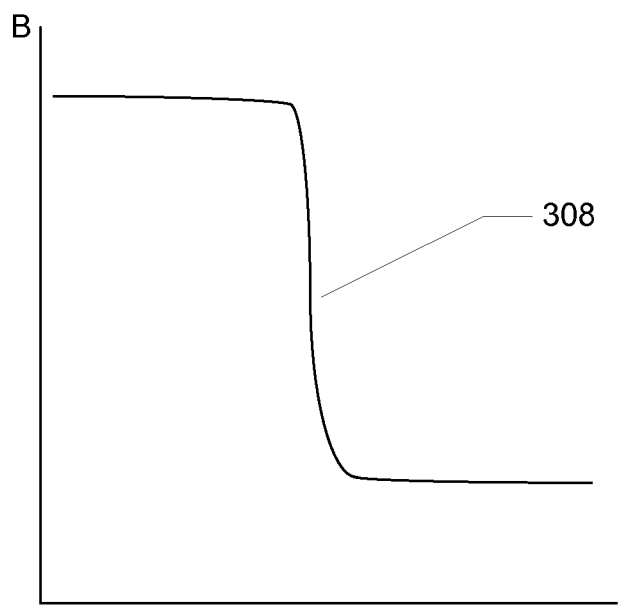
FIG. 3B illustrates low-frequency components, which are produced by passing an HDR image through a low-pass filter.

FIG. 3B illustrates low-frequency components 308, such as the low-frequency components 206, which are produced by passing the HDR image 102 through a low-pass filter, such as the low-pass filter 204.

Figure 3C:
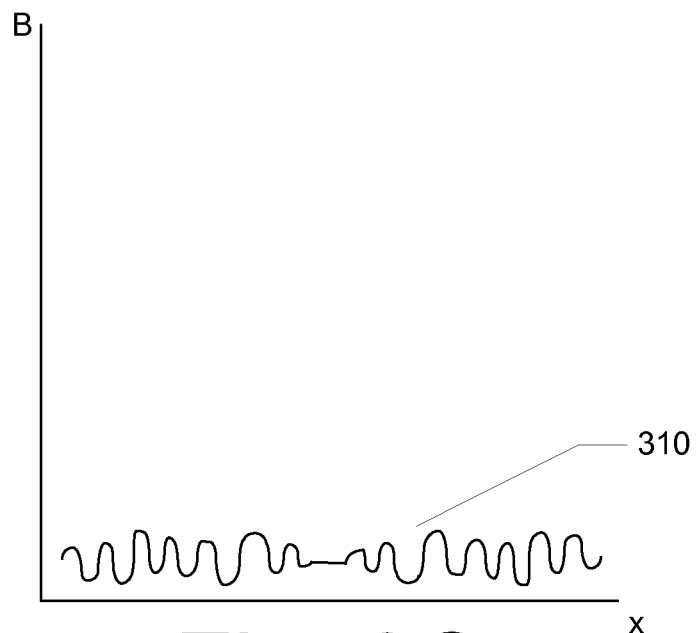
FIG. 3C illustrates high-frequency components, which are produced by dividing the low-frequency components from the spatial frequency components of the HDR image (or by subtracting the spatial frequency components by the low-frequency components).

FIG. 3C illustrates high-frequency components 310, such as the high-frequency components 210, which are produced by dividing the low-frequency components 308 from the spatial frequency components 302 of the HDR image (or by subtracting the spatial frequency components 302 by the low-frequency components 308).

Figure 3D:
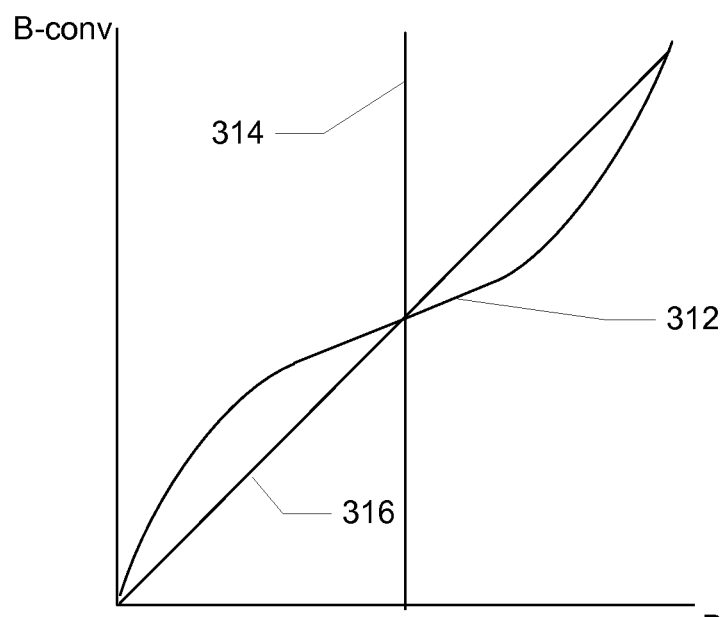
FIG. 3D illustrates an inverse-S tone curve applied by dynamic range compression.

FIG. 3D illustrates an inverse-S tone curve 312 applied by the dynamic range compression 212. In the graph shown in FIG. 3D, the pixels of the image are converted to a brightness, "B-conv," depending on their original level of brightness "B." The relatively bright pixels, those to the right of line 314, are thereby slightly attenuated in brightness, while the darker pixels, those to the left of the line 314, are slightly increased in brightness. (By contrast, a tone curve represented by a 45-degree line, such as the line 316, would result in no change in the brightness of the pixels.

Figure 3E:
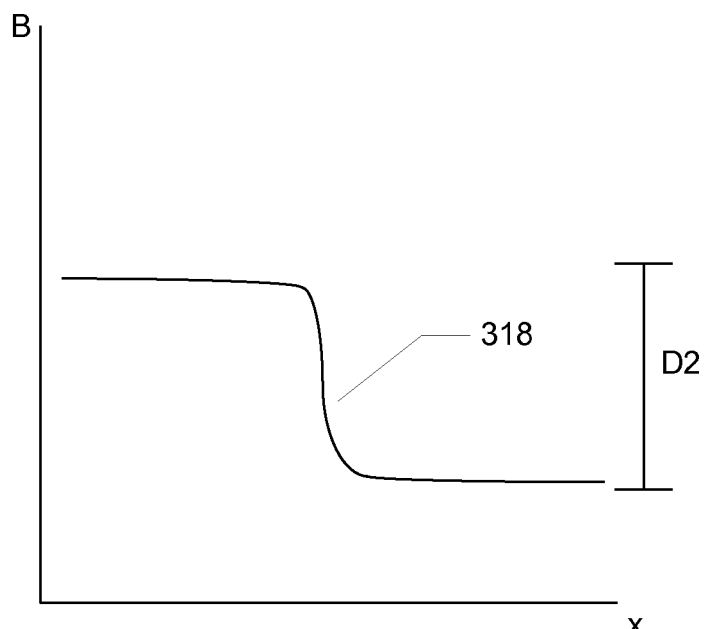
FIG. 3E illustrates a compressed low-frequency components, produced by applying a tone curve to low-frequency components.

FIG. 3E illustrates a compressed low-frequency components 318, such as the compressed low-frequency components 214, produced by applying a tone curve to the low-frequency components 308. In particular, the compressed low-frequency components 318 result from application of the inverse-S tone curve 312. The compressed low-frequency components 318 have a compressed dynamic range D2, which either fits within the dynamic range of the display of the device 100, or is closer than the dynamic range D1 of the HDR image 102 to fitting into the dynamic range of the display of the device 100.

Figure 3F:
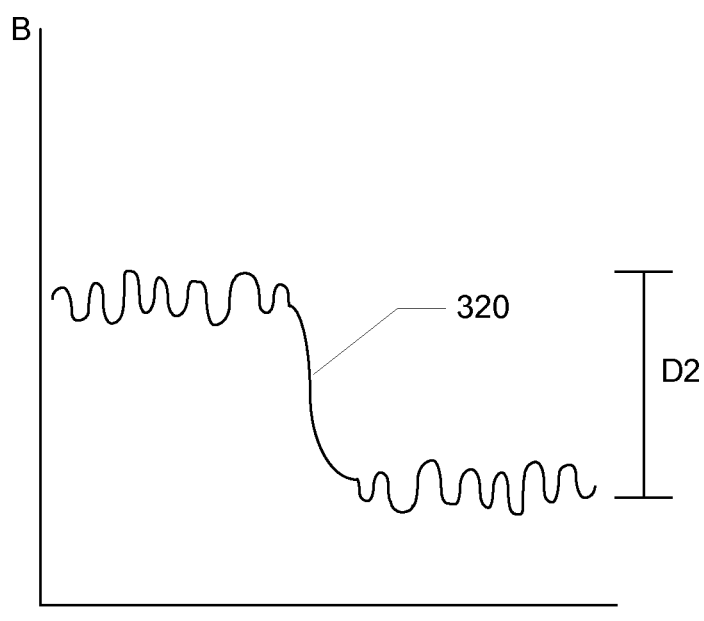
FIG. 3F illustrates spatial frequency components of a reconstructed image produced by adding the compressed low-frequency components to the high-frequency components.

FIG. 3F illustrates spatial frequency components 320 of the reconstructed image 114 produced by adding the compressed low-frequency components 318 to the high-frequency components 310. The local contrast features, represented by the high-frequency components 310, are preserved, while the global dynamic range D1 of the reconstructed image 114 is reduced to D2 in the reconstructed image 114 by the compression of the low-frequency components 308.

Figure 4:
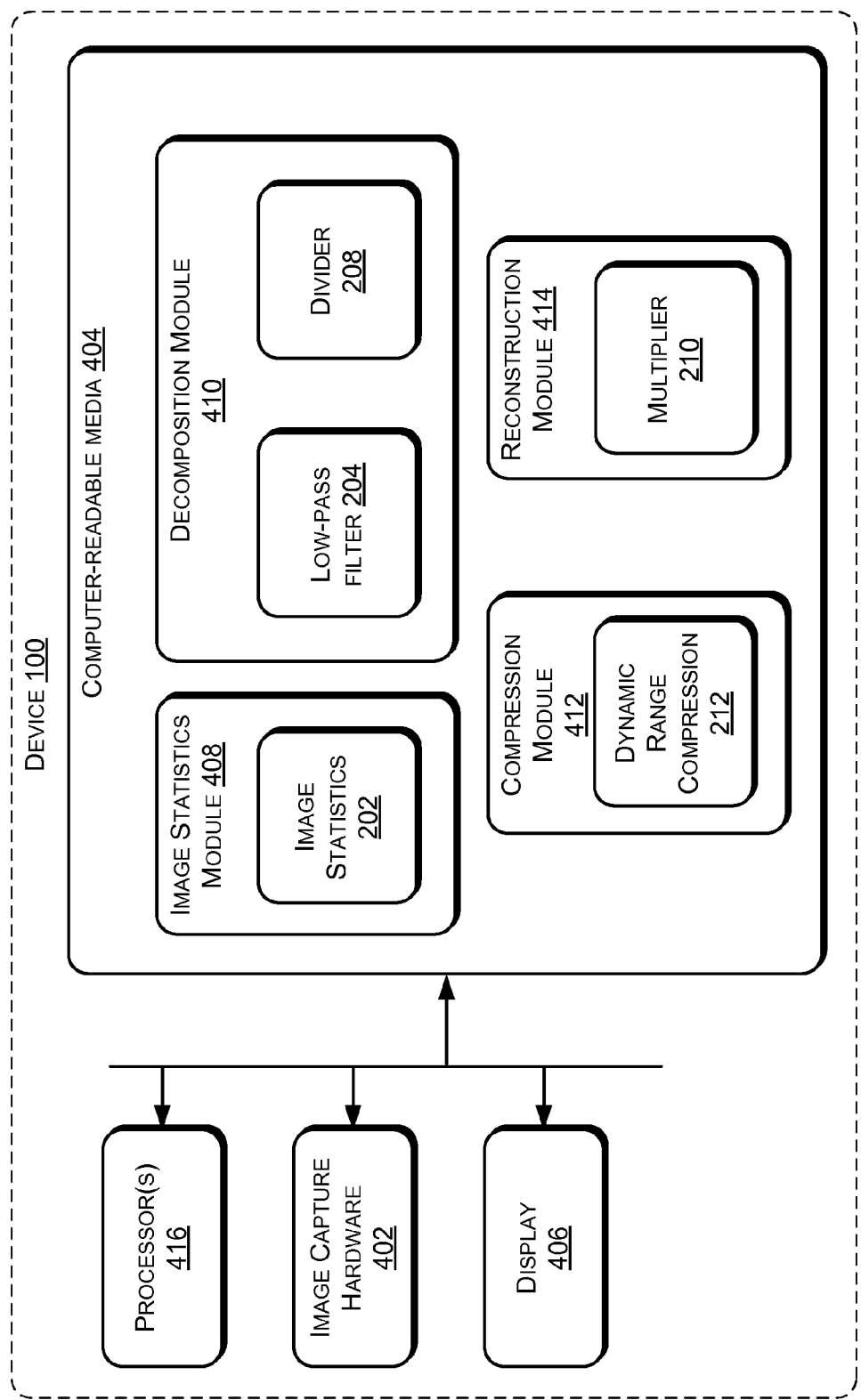
FIG. 4 illustrates a block diagram of a device configured to process HDR images by compressing the low-frequency components of an image.

FIG. 4 illustrates a block diagram of a device 100 configured to process HDR images by compressing the low-frequency components of an image. The HDR image 102 may be captured using image capture hardware 402, which may include a still-frame capture camera and/or a video camera. The image capture hardware 402 captures the HDR image 102 and stores it in a computer-readable media 404 and/or causes it to be displayed on display 406. The display may be a liquid crystal display (LCD), a plasma display, a cathode ray tube (CRT) display, or other display. The display may include a touch-sensitive surface, configured to detect user touch input for control of the device 100.

An image statistics module 408 is configured to determine one or more image statistics 202 of the image, such as the sizes of the bright and dark regions of the image. A decomposition module 410 is configured to decompose the image into a low spatial frequency component and a high spatial frequency component. This includes using low-pass filter 204 to produce the low spatial frequency components 206, and using divider 208 to produce the high-frequency components 210. The decomposition module 410 selects the low-pass filter 204 based at least on the image statistics 202.

A compression module 412 applies dynamic range compression 212 to the low-frequency components 206 to produce the compressed low-frequency components 214. And a reconstruction module 414 utilizes multiplier 216 to produce the reconstructed image 114.

In one example configuration, device 100 comprises one or more processor(s) 416. The computer-readable media 404 stores program instructions that are loadable and executable on the processor(s) 416, as well as data generated during execution of, and/or usable in conjunction with, these programs. Computer-readable media 404 stores image statistics module 408, the decomposition module 410, the compression module 412, and the reconstruction module 414.

Depending on the configuration and type of computing system used, computer-readable media 404 may include volatile memory (such as random access memory (RAM)) and/or non-volatile memory (such as read-only memory (ROM), flash memory, etc.). Computer-readable media 404 may also include additional removable storage and/or non-removable storage including, but not limited to, flash memory, magnetic storage, optical storage, and/or tape storage that may provide non-volatile storage of computer readable instructions, data structures, program modules, and other data.

Computer-readable media 404 includes at least two types of computer-readable media, namely computer-readable storage media and communications media. Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media embodied in a signal, such as a modulated data signal, carrier wave, or other transmission mechanism.

Although the device 100 is shown in FIG. 4 having programming modules stored on the computer-readable media 404 and executable by the processors 416, various embodiments include one or more of the functions of the device 100, such as decomposition, compression, or reconstruction, performed by one or more dedicated circuit components, which may include an application-specific integrated circuit (ASIC), a programmable circuit (such as a field programmable gate array (FPGA)), or other circuit.

Example Process

Figure 5:
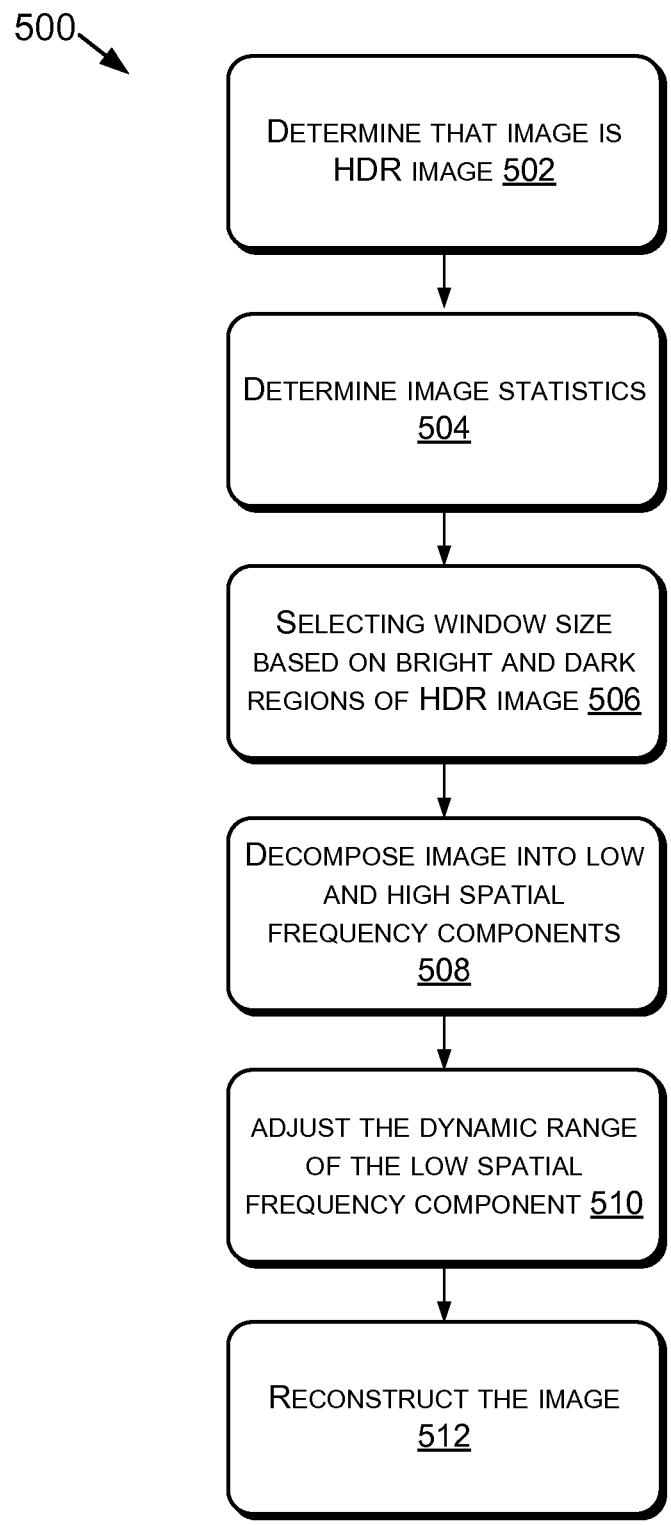
FIG. 5 illustrates an example process for processing an HDR image to compress its global dynamic range.

FIG. 5 illustrates an example process 500 for processing an HDR image to compress its global dynamic range. At 502, it is determined, such as by a device that performs image processing (such as the device 100), that the image is an HDR image. Determining that the image is an HDR image may include determining the global dynamic range of the image, and comparing it to a threshold dynamic range. Determining that the image is an HDR image may include determining that the image has a threshold number of pixels at or near to the maximum and minimum brightness levels.

At 504, image statistics are determined. The image statistics include sizes of a plurality of dark and bright regions within the HDR image, although other statistics may be determined.

At 506, a window size is selected for a low-pass filter based on the image statistics, such as based on sizes of the plurality of dark and bright regions of the HDR image. In some embodiments, the window size of the low-pass filter is selected based on the smallest of the dark and bright regions of the image, such that the window size is equal to or greater than the size of the smallest of the dark and bright regions. In other embodiments, window sizes are selected based on an average size of the bright and dark regions, based on percentile (for example, selected to be larger than at least 95% of the bright and dark regions (or other percentage)), based on the second-smallest dark or bright region, and so forth.

At 508, the image is decomposed into low spatial frequency components and high spatial frequency components. This includes performing low-pass filtering to produce the low-frequency components and subtracting the low-frequency components from the HDR image to produce the high-frequency components. Alternatively, the HDR image is divided by the low-frequency components to produce the high-frequency components. In still other embodiments, other filtering processes may be used, such as applying a high-pass filter to produce the high-frequency components, and then subtracting the high-frequency components from the HDR image to produce the low-frequency components.

At 510, the dynamic range of the low spatial frequency component is adjusted to produce an adjusted low spatial frequency component. In embodiments, the adjusting comprises compressing the dynamic range of the low spatial frequency components includes applying a tone curve to the low spatial frequency component to produce a compressed low spatial frequency component. In one non-limiting example, an inverse-S tone curve is applied, although other tone curves may be utilized to compress the global dynamic range of the low-frequency components in accordance with various embodiments.

At 512, the image is reconstructed using the compressed low spatial frequency component and the high spatial frequency component to produce a reconstructed, processed image. In embodiments, reconstructing the image includes adding or multiplying the compressed low spatial frequency component and the high spatial frequency component. Where division is used to generate the high-frequency component at 508, multiplication is used to reconstruct the image at 512. Where subtraction is used to generate the high-frequency component at 508, addition is used to reconstruct the image at 512.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Operations of process 500 can be suitably combined and may comport with techniques and/or configurations described in connection with FIGS. 1-4 in various embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is intended that embodiments described herein be limited only by the claims and the equivalents thereof.

What is claimed is:

1. A method of adjusting a global dynamic range of an image, the method comprising:
    based on one or more sizes of (i) a plurality of contiguous bright regions of the image and (ii) a plurality of contiguous dark regions of the image, selecting a window size of a low-pass filter, wherein the window size is selected such that the window size is larger than at least a certain percentage of (i) the plurality of contiguous bright regions of the image or (ii) the plurality of contiguous dark regions of the image;
    decomposing the image into (i) a low spatial frequency component and (ii) a high spatial frequency component, the decomposing based at least on the window size of the low-pass filter;
    adjusting a global dynamic range of the low spatial frequency component to produce an adjusted low spatial frequency component; and
    reconstructing the image with (i) the adjusted low spatial frequency component and (ii) the high spatial frequency component to thereby produce a processed image.

2. The method of claim 1, wherein the adjusting the global dynamic range of the low spatial frequency component includes compressing the global dynamic range of the low spatial frequency component to produce a compressed low spatial frequency component.

3. The method of claim 1, wherein decomposing the image includes:

low-pass filtering the image using the low-pass filter to produce the low spatial frequency component; and
dividing the image by the low spatial frequency component to thereby produce the high frequency component.

4. The method of claim 1, wherein the window size is based on a smaller one of either (i) the plurality of contiguous bright regions or (ii) the plurality of contiguous dark regions.

5. The method of claim 1, wherein reconstructing the image includes multiplying the adjusted low spatial frequency component and the high spatial frequency component.

6. The method of claim 1, wherein adjusting the dynamic range of the low spatial frequency components includes applying a tone curve to the low spatial frequency component to produce the adjusted low spatial frequency component.

7. The method of claim 6, wherein the adjusting the global dynamic range of the low spatial frequency component includes applying the tone curve to the low spatial frequency component to produce a compressed low spatial frequency component.

8. The method of claim 7, wherein the tone curve is an inverse-S tone curve.

9. The method of claim 1, wherein:
the image has a first global dynamic range that exceeds a dynamic range of a display device;
the processed image has a second global dynamic range that fits within the dynamic range of the display device; and
the method further comprises causing display of the image on the display device.

10. The method of claim 9, wherein the high spatial frequency component of the image has a local contrast that is preserved in the processed image.

11. An apparatus comprising:
a display device; and
a hardware logic circuit configured to:
select a window size of a low-pass filter based on one or more sizes of (i) a plurality of contiguous bright regions of a high dynamic range (HDR) image and (ii) a plurality of contiguous dark regions of the HDR image, wherein the window size is selected such that the window size is larger than at least a certain percentage of (i) the plurality of contiguous bright regions or (ii) the plurality of contiguous dark regions;
decompose, based at least on the window size of the low-pass filter, the HDR image into (i) a low spatial frequency component and (ii) a high spatial frequency component;
adjust a dynamic range of the low spatial frequency component to produce an adjusted low spatial frequency component; and
reconstruct the HDR image with (i) the adjusted low spatial frequency component and (ii) the high spatial frequency component to produce a processed image for display on the display device.

12. The apparatus of claim 11, wherein the hardware logic circuit is further configured to adjust the global dynamic range of the low spatial frequency component by compression of the global dynamic range of the low spatial frequency component to produce a compressed low spatial frequency component.

13. The apparatus of claim 11, wherein the hardware logic circuit is further configured to decompose the image by:
low-pass filtering the HDR image using the low-pass filter to produce the low spatial frequency component; and
dividing the HDR image by the low spatial frequency component to produce the high frequency component.

14. The apparatus of claim 11, wherein:
the HDR image has a first global dynamic range that exceeds a dynamic range of the display device; and
the processed image has a second global dynamic range that fits within the dynamic range of the display device.

15. The apparatus of claim 14, wherein the low spatial frequency component of the HDR image has a local contrast that is preserved in the processed image.

16. The apparatus of claim 11, wherein the hardware logic circuit is further configured to adjust the dynamic range of the low spatial frequency components by applying a tone curve to the low spatial frequency component to thereby produce the adjusted low spatial frequency component.

17. The apparatus of claim 16, wherein the tone curve is an inverse-S tone curve.

18. The apparatus of claim 11, wherein reconstructing the image includes multiplying the adjusted low spatial frequency component and the high spatial frequency component.

* * * * *